US010120086B2

United States Patent
Harper et al.

(10) Patent No.: US 10,120,086 B2
(45) Date of Patent: Nov. 6, 2018

(54) SYSTEM AND METHOD FOR RESONATOR FREQUENCY CONTROL BY ACTIVE FEEDBACK

(71) Applicants: Mark Francis Lucien Harper, Cambridge (GB); Joseph Anthony Dellinger, Houston, TX (US)

(72) Inventors: Mark Francis Lucien Harper, Cambridge (GB); Joseph Anthony Dellinger, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 1012 days.

(21) Appl. No.: 14/515,223

(22) Filed: Oct. 15, 2014

(65) Prior Publication Data
US 2015/0301205 A1    Oct. 22, 2015

Related U.S. Application Data

(60) Provisional application No. 61/894,729, filed on Oct. 23, 2013.

(51) Int. Cl.
*G01V 1/00* (2006.01)
*G01V 1/133* (2006.01)
*G01V 1/24* (2006.01)

(52) U.S. Cl.
CPC .............. *G01V 1/005* (2013.01); *G01V 1/133* (2013.01); *G01V 1/24* (2013.01)

(58) Field of Classification Search
USPC .......................................................... 367/190
See application file for complete search history.

(56) References Cited

U.S. PATENT DOCUMENTS

| | | | |
|---|---|---|---|
| 3,854,118 A | 12/1974 | Pelton | |
| 4,142,171 A | 2/1979 | Pickens | |
| 4,637,002 A * | 1/1987 | Sallas | G01V 1/04 181/401 |
| 4,782,446 A | 11/1988 | Ehler et al. | |

(Continued)

FOREIGN PATENT DOCUMENTS

| | | |
|---|---|---|
| EP | 2267486 | 12/2010 |
| GB | 2495801 | 4/2013 |

(Continued)

OTHER PUBLICATIONS

Written Opinion of the International Search Authority—for PCT/US2014/060673, dated Apr. 26, 2016. (6 pages).*
PCT Search Report dated Feb. 24, 2015.

*Primary Examiner* — James R Hulka
(74) *Attorney, Agent, or Firm* — Robert Hsiao

(57) ABSTRACT

There is taught herein a system and method for creating an improved seismic source signal by applying a feedback mechanism, active adaptive control, to perturb a resonator device configuration on the fly so as to ensure that the overall trajectory of the sweep is correctly produced, even though the precise details of each oscillation of the source are still not constrained. An embodiment teaches a method for adjusting the squeeze piston or tow depth of a resonant piston seismic source to bring the resonant frequency to a desired value. As a consequence, the resulting seismic signal is improved as compared with seismic signals acquired via resonators that do not utilize the instant teachings.

22 Claims, 3 Drawing Sheets

(56) References Cited

U.S. PATENT DOCUMENTS

| | | | |
|---|---|---|---|
| 4,930,113 A * | 5/1990 | Sallas | G01V 1/04 181/108 |
| 6,035,257 A | 3/2000 | Epperson | |
| 6,522,974 B2 * | 2/2003 | Sitton | G01V 1/364 702/1 |
| 8,342,288 B2 * | 1/2013 | Eick | G01V 1/047 181/114 |
| 8,387,744 B2 * | 3/2013 | Harper | G01V 1/135 181/113 |
| 8,792,300 B2 | 7/2014 | Sallas | |
| 8,902,698 B2 | 12/2014 | Hegna et al. | |
| 8,907,506 B2 | 12/2014 | Marin | |
| 8,950,263 B2 | 2/2015 | Giordano et al. | |
| 2007/0133354 A1 | 6/2007 | Bagaini et al. | |
| 2008/0253226 A1 | 10/2008 | Tenghamn et al. | |
| 2011/0085416 A1 | 4/2011 | Sallas | |
| 2011/0162906 A1 | 7/2011 | Harper et al. | |
| 2011/0170375 A1 * | 7/2011 | Thompson | G01V 1/137 367/131 |
| 2011/0297476 A1 * | 12/2011 | Harper | G01V 1/145 181/121 |
| 2012/0063263 A1 | 3/2012 | Kamata et al. | |
| 2012/0155217 A1 | 6/2012 | Dellinger et al. | |
| 2013/0021875 A1 | 1/2013 | Eick et al. | |
| 2013/0100766 A1 | 4/2013 | Teyssandier et al. | |
| 2013/0155810 A1 | 6/2013 | Dowle et al. | |
| 2013/0193693 A1 | 8/2013 | Marin et al. | |
| 2013/0201789 A1 | 8/2013 | Phillips et al. | |
| 2013/0264141 A1 | 10/2013 | Wei et al. | |
| 2013/0308422 A1 | 11/2013 | Eick et al. | |
| 2013/0333974 A1 | 12/2013 | Coste et al. | |
| 2014/0043937 A1 | 2/2014 | Teyssandier et al. | |
| 2014/0104986 A1 | 4/2014 | Teyssandier et al. | |
| 2014/0112097 A1 | 4/2014 | Dowle et al. | |
| 2014/0226439 A1 | 8/2014 | Tenghamn | |
| 2014/0254312 A1 | 9/2014 | Dowle et al. | |
| 2014/0254313 A1 | 9/2014 | Dowle et al. | |

FOREIGN PATENT DOCUMENTS

| | | |
|---|---|---|
| WO | 2009153595 | 12/2009 |
| WO | WO-2009/153595 | 12/2009 |
| WO | 2011/090743 A2 | 7/2011 |
| WO | 2014076076 | 5/2014 |

\* cited by examiner

SYSTEM AND METHOD FOR RESONATOR FREQUENCY CONTROL BY ACTIVE FEEDBACK

CROSS-REFERENCE TO RELATED APPLICATIONS

This application claims benefit of U.S. provisional patent application Ser. No. 61/894,729 filed Oct. 23, 2013, and entitled "System and Method for Resonator Frequency Control by Active Squeeze Position Feedback," which is hereby incorporated herein by reference in its entirety.

STATEMENT REGARDING FEDERALLY SPONSORED RESEARCH OR DEVELOPMENT

Not applicable.

TECHNICAL FIELD

This disclosure relates to the general subject of seismic exploration and surveillance and, in particular, to methods for controlling seismic sources to obtain better images of the subsurface of the earth for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths when conventional impulsive sources are used are 5-16 seconds, which corresponds to 2500-8000 samples at a 2-millisecond interval. If a non-impulsive source is used, the extended activation time of the source needs to be accommodated for, so the trace lengths will generally be longer, or recording may be continuous. Conventionally each trace records one seismic source activation, so there is one trace for each live source location-receiver activation. In the case of continuous recording, the traces may be windowed out of the continuous data in a pre-processing step, and in this case consecutive traces may overlap in time. In some instances, multiple physical sources might be activated simultaneously but the composite source signal will be referred to as a "source" herein, whether generated by one or many physical sources.

In a typical 2-D survey, there will usually be several tens of thousands of traces, whereas in a 3-D survey the number of individual traces may run into the multiple millions of traces.

After acquisition, the seismic traces will need to be processed in order to make them ready for use in exploration. One important component of such processing is obtaining accurate estimates of the subsurface velocities proximate to the survey. Having accurate subsurface velocity estimates is useful in seismic exploration in a variety of contexts. For example, the distribution of subsurface velocities can be used directly as being indicative of the geologic structure, lithology, layer content, etc. in the subsurface. Another, and arguably more important, use for such velocities is in the processing of seismic data to image the subsurface.

In many cases, an initial rough velocity model of the subsurface is available from well logs, picks from a seismic velocity analysis, etc., which is subsequently improved based on the acquired seismic data. Historically, an important method for updating a velocity model for seismic depth imaging in areas of complex geology has been based upon ray-based reflection tomography. More recently, a method known as full-waveform inversion (FWI) has been applied to update velocity models. However, because of the non-linearity of the inverse problem, a multi-scale approach is typically used in FWI, i.e., low-frequency data are inverted first, followed by data with progressively higher frequencies.

One of the uncertainties that is inherent in applying FWI with standard seismic data is that the seismic source signature is an unknown variable which must be solved for as part of the inverse problem. In addition, neither the source nor seismic data typically contain sufficient low frequencies (e.g., less than about 4 Hz) for FWI to succeed without a good knowledge, a priori, of the subsurface velocity model. As a consequence, seismic sources have been developed or modified to provide additional seismic energy in frequency bands that are important for imaging.

Sources that might be attractive in this regard include marine and land controllable seismic sources. For purposes of the instant disclosure, the term "controllable source" will be used to refer to an acoustic seismic source that radiates sound predominantly at a single frequency at a time, whose profile of frequency versus time after the start of the sweep is controllable and continuous, and whose physical limitations impose a limit on the amplitude of its output which will normally vary with frequency. Controllable sources include, by way of example only, vibroseis sources on land, and at sea, marine resonators, etc.

Of particular interest for this disclosure are controllable seismic sources of the resonant piston marine seismic variety. Information concerning same may be found in, for example, U.S. provisional patent Ser. No. 61/290,611 and its child PCT application PCT/US2010/062329, the disclosures of which are incorporated herein by reference as if fully set out at this point.

A vibrator-type controllable seismic source typically is generally asked to perform a precisely specified sweep. Ideally, every movement of the source can be controlled so that the resulting waveform matches that which is desired. However, in contrast, a resonator-type marine seismic source changes its configuration in a prescribed fashion so as to change its resonant frequency with time along a desired trajectory, but the precise details of the sweep are not constrained. So, for example, a resonant source should ideally produce a specified frequency as a function of time in the sweep, but the phase may not be so precisely specified. If the conditions are not as expected, the sweep may deviate from the desired frequency trajectory and the resulting signal may not provide the expected frequency as a function of time, or in some cases may not even contain the required frequency content.

Thus, what is needed is a way to generate a seismic signal with a controllable source such that the resulting signal has properties that make it more suitable for imaging the subsurface.

Accordingly, it should now be recognized, as was recognized by the present inventors, that there exists, and has existed for some time, a very real need for a method of seismic data acquisition that would address and solve the above-described problems.

Before proceeding to a description, however, it should be noted and remembered that the disclosure which follows, together with the accompanying drawings, should not be construed as limiting the teachings of this document to the examples (or embodiments) shown and described. This is so because those skilled in the art to which this disclosure pertains will be able to devise other variations within the ambit of the appended claims.

BRIEF SUMMARY OF THE DISCLOSURE

There is taught herein a system and method for creating an improved seismic source signal by applying, in an embodiment, a feedback mechanism, active adaptive control, to perturb a resonator device configuration on the fly so as to ensure that the overall trajectory of the sweep is correctly produced, even though the precise details of each oscillation of the source are still not constrained. As a consequence, the resulting seismic signal is improved as compared with seismic signals acquired via resonators that do not utilize the instant teachings.

In an embodiment, a method of keeping the amplitude peaks of a resonator occurring at more nearly the correct time intervals is taught. This variation should keep the average frequency almost, if not exactly, correct. Even so the phase of the signal, which increases as the integral of frequency with respect to time from the beginning of the transmission, may differ from its intended value, particularly towards the end of a transmission. However since the operation of the source does not require absolute precision of frequency, a fortiori it also does not require the phase to be exactly as intended either, and errors in excess of a cycle (360 degrees) may be tolerable, depending on the application. The expectation is that the optimal aggressiveness factor as taught below will also vary from day to day and an experienced operator will quickly learn how to find a suitable value for the current conditions.

According to an embodiment, there is taught herein a method of seismic exploration above a region of the subsurface of the earth containing structural or stratigraphic features conducive to the presence, migration, or accumulation of hydrocarbons, the method comprising: selecting a controllable source having a squeeze piston integral thereto; selecting a sweep pattern; performing a sweep with said controllable source using said sweep pattern, said sweep having a sweep duration associated therewith; measuring at least one frequency deviation between said performed sweep and said sweep pattern during said sweep; using at least one of said at least one measured frequency deviation and said sweep pattern to determine a squeeze piston position perturbation; while said sweep is being performed, using said determined squeeze piston position perturbation to adjust a position of said squeeze piston within said controllable source; recording seismic data generated by said sweep; and, using any of said recorded seismic data to explore within said region of the subsurface of the earth.

Another embodiment of the invention concerns a resonant piston marine seismic resonator comprising: a housing; a gas spring situated within said housing; a squeeze piston within said housing and in fluid communication with said gas spring; and, a microprocessor in electronic communication with said gas spring and said squeeze piston, said microprocessor containing computer instructions comprising: executing a desired sweep pattern using said gas spring; measuring at least one frequency deviation between said desired sweep pattern and a sweep pattern actually obtained; using at least one of said at least one frequency deviation to adjust a position of said squeeze piston within said resonator and, executing said desired sweep pattern after said squeeze piston has been adjusted within said resonator.

According to a further embodiment, there is provided herein a method of seismic exploration above a region of the subsurface of the earth containing structural or stratigraphic features conducive to the presence, migration, or accumulation of hydrocarbons, the method comprising: selecting a tunable controllable source; selecting a parameter related to a resonant frequency of said controllable source; selecting a sweep pattern; performing a sweep with said controllable source using said sweep pattern; during said sweep measuring at least one frequency deviation between said performed sweep and said sweep pattern; during said sweep using said at least one frequency deviation to adjust said parameter related to said resonant frequency of said controllable source; recording seismic data generated by said sweep; and, using any of said recorded seismic data to explore within said region of the subsurface of the earth.

Another embodiment comprises a method of seismic exploration above a region of the subsurface of the earth containing structural or stratigraphic features conducive to the presence, migration, or accumulation of hydrocarbons, the method comprising: selecting a controllable source having a gas spring integral thereto; determining a desired resonant frequency of said controllable source; setting a tow depth of said controllable source to cause said controllable source to have a resonant frequency at least approximately equal to said desired resonant frequency; selecting a sweep pattern; performing a sweep with said controllable source using said sweep pattern; measuring at least one frequency deviation between said performed sweep and said sweep pattern; using at least one of said at least one frequency deviation to adjust the tow depth of said controllable source, thereby adjusting the resonant frequency of said controllable source; performing a second sweep of said controllable source using said adjusted tow depth; recording any seismic data generated by said second sweep; and, using said recorded seismic data to explore within said region of the subsurface of the earth.

According to a further embodiment there is provided a method of seismic exploration above a region of the subsurface of the earth containing structural or stratigraphic features conducive to the presence, migration, or accumulation of hydrocarbons, the method comprising: selecting a controllable source having a gas spring integral thereto; determining at least one parameter related to a resonant frequency of said controllable source; selecting a sweep pattern; performing a sweep with said controllable source using said sweep pattern; during said sweep, continuously determining at least one frequency deviation between said performed sweep and said selected sweep pattern, and, continuously using said at least one determined frequency deviation to adjust at least one of said at least one parameters related to a resonant frequency of said controllable source, thereby creating an adjusted resonant frequency of said controllable source; recording seismic data generated by said sweep; and, using any of said recorded seismic data to explore within said region of the subsurface of the earth.

With respect to another embodiment, there is provided a method of seismic exploration above a region of the subsurface of the earth containing structural or stratigraphic features conducive to the presence, migration, or accumulation of hydrocarbons, the method comprising: selecting a tunable resonant seismic source; selecting at least one adjustable parameter related to a resonance frequency of said tunable resonant seismic source; selecting a sweep pattern; performing a sweep with said tunable resonant seismic source using said sweep pattern; during said sweep, measuring at least one frequency deviation between said performed sweep and said sweep pattern, and, using said at least one frequency deviation to adjust said at least one adjustable parameter of said tunable resonant seismic source in real time, thereby adjusting said resonance frequency of said tunable resonant seismic source; recording seismic data generated by said sweep; and, using said recorded seismic data to explore within said region of the subsurface of the earth.

Another embodiment teaches a method of seismic exploration above a region of the subsurface of the earth containing structural or stratigraphic features conducive to the presence, migration, or accumulation of hydrocarbons, the method comprising: selecting a tunable resonant seismic source; selecting at least one adjustable parameter related to a resonance frequency of said tunable resonant seismic source; selecting a sweep pattern; performing a sweep with said tunable resonant seismic source using said sweep pattern; measuring at least one frequency deviation between said performed sweep and said sweep pattern; using any of said at least one frequency deviation to adjust at least one of said at least one adjustable parameter of said tunable resonant seismic source, thereby adjusting said resonance frequency of said tunable resonant seismic source; performing a second sweep of said tunable resonant seismic source after said resonance frequency has been adjusted; recording any seismic data generated by said second sweep; and, using said recorded seismic data to explore within said region of the subsurface of the earth.

Other embodiments and variations are certainly possible within the scope of the instant disclosure and can readily be formulated by those of ordinary skill in the art based on the disclosure herein.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages will become apparent upon reading the following detailed description and upon reference to the drawings in which.

DETAILED DESCRIPTION

Figure 1:
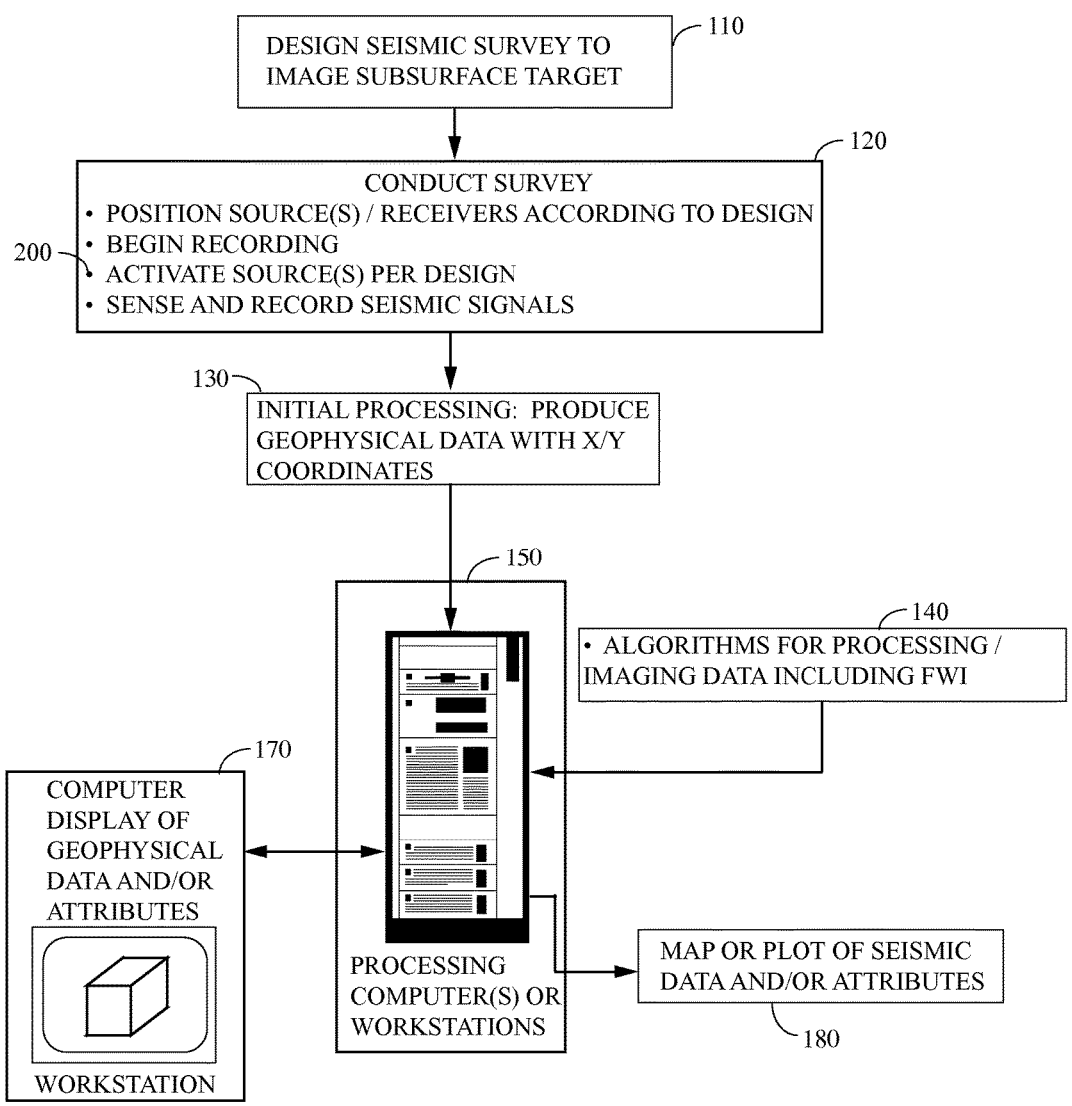
FIG. 1 illustrates a general seismic acquisition and processing environment.

While this disclosure is susceptible of embodiment in many different forms, there is shown in the drawings, and will herein be described hereinafter in detail, some specific embodiments of the instant disclosure. It should be understood, however, that the present disclosure is to be considered an exemplification of the principles discussed herein and is not intended to limit same to the specific embodiments or algorithms so described.

Turning now to FIG. 1, this figure contains a general overview of an embodiment and its associated environment. As is indicated, a seismic survey will be designed 110 to image a target in or region of the subsurface according to methods well known to those of ordinary skill in the art. The survey might be, for example, a VSP (vertical seismic profile), land survey, marine survey, or some combination. Those of ordinary skill in the art will understand how surveys are designed and especially how such might be done where the object is to image a particular subsurface target.

As part of this process, software algorithms 140 will be made available to a CPU 150, which CPU might include any conventional or unconventional programmable computing device. The algorithms might include standard seismic processing modules as well as algorithms optimized to take advantage of controlled-frequency seismic sources with active frequency control. In an embodiment the availability of such improved sources will factor into the design process 110.

In the field, seismic data will be collected according to the survey design (block 120). This will typically involve positioning source and receivers at least approximately according to the design and recording source activations as is typically done. The recorded seismic waves (i.e., the seismic data) may (or may not) be subjected to some in-field processing before transmitting it on to a processing center where the bulk of the processing will typically take place. Unlike conventional sources, in an embodiment the source (s), after activation 200, execute a feedback process 260 to keep their frequency accurate despite external perturbations, as will be expanded in the example of FIG. 2.

Typically within a processing center some initial processing will be performed to associate each seismic recording with a surface or other location (block 130), although some aspects of this block might also have been performed while the data were still in the field. In either case, a computer system 150, which might be a workstation, a server, a main frame, a parallel computer, a networked collection of computers or workstations, etc., will typically be engaged to process the data further in preparation for using it in exploration.

Conventionally, the seismic data will be processed and viewed on a computer display such as that of a workstation 170. Output from the seismic processing may be used to create maps or plots of seismic data and/or seismic attributes 180 according to methods well known to those of ordinary skill in the art.

In many instances the methods taught herein would be made a part of the survey design component of block 110 and then implemented at the time the survey is conducted (block 120).

Figure 2:
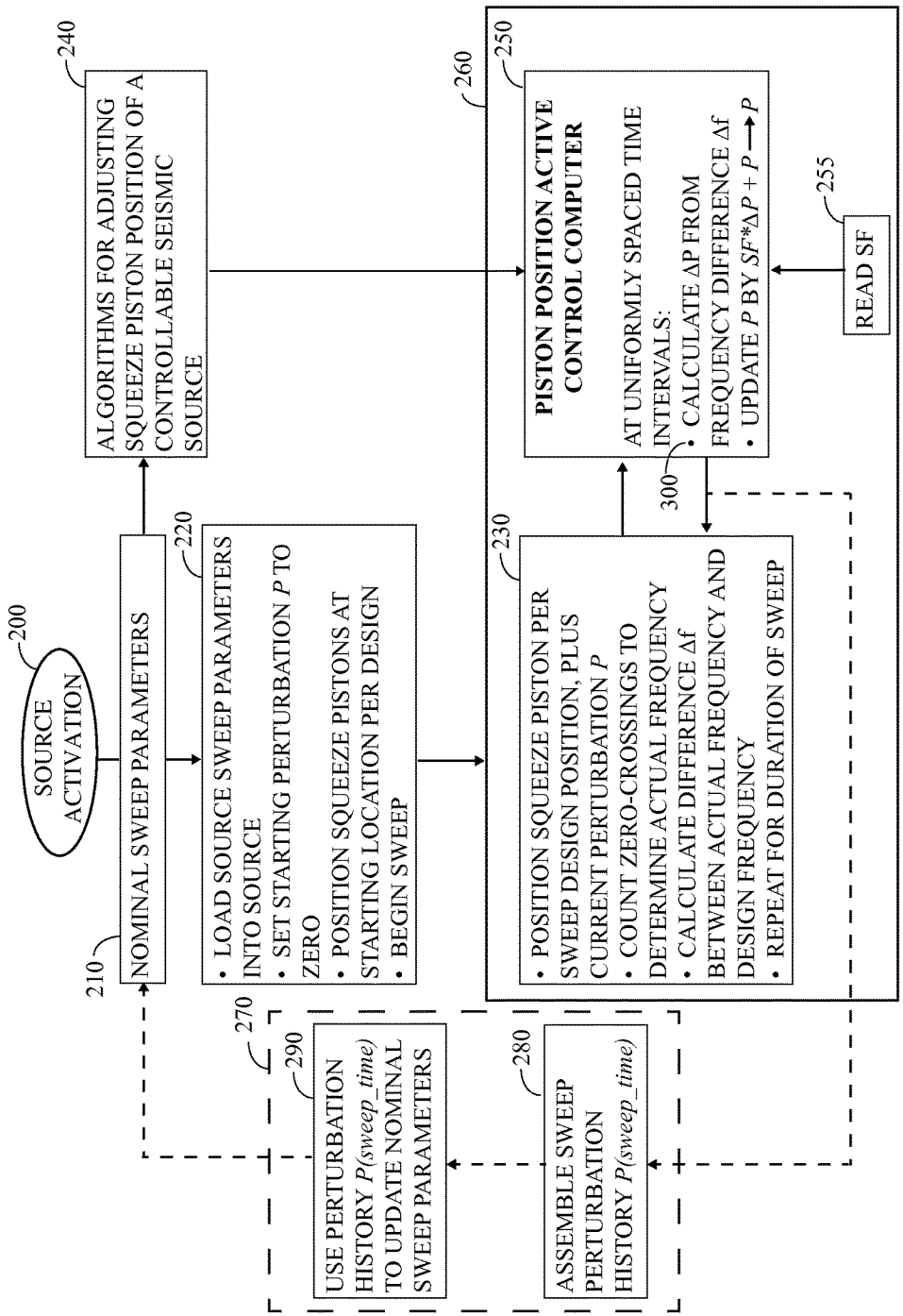
FIG. 2 illustrates an embodiment of how the source might be controlled by a piston position active control computer.

FIG. 2 shows an example embodiment of how the teachings contained herein might be implemented in a controlled-frequency resonant-piston marine seismic source. The nominal sweep design parameters 210 will be used both to initialize the source 220 and as adjustable user parameters in the feedback algorithm 240. The algorithms taught herein 240 could be stored on local or remote hard disk or within some other sort of nonvolatile memory storage device (e.g., a flash drive). The algorithms 240 could be used in a control computer CPU 250 that would typically be physically attached to the underwater seismic source but might also be on the towing ship (not shown). In this embodiment the control computer CPU 250 would monitor the operating seismic source 230, calculate the necessary perturbation 300 (using, in some embodiments, stabilization factor 255), and update the resonant marine source's internal configuration as necessary to adjust the emitted frequency back to nominal. (The optional additional feedback process 270 which operates from one sweep to the next will be discussed later.)

According to an embodiment, there is provided a system and method for improving images derived from seismic data (both transmitted and reflected) by improving the predictability and quality of the source signal that is generated from a controllable source.

As an initial matter, an embodiment of the invention will utilize a resonant piston seismic source with at least two modes of acquisition: monofrequency "humming," and sweeping over frequency. When operated in "sweeping" mode the instant device produces a signal much like marine vibroseis in concept. In an embodiment and according to one example, a sweep from about 2 Hz to about 8 Hz will be considered a "narrowband" sweep. Here "narrowband" is meant to describe a bandwidth of less than two to three octaves. Such a sweep lacks sufficient bandwidth for conventional imaging purposes, but may be superior for other applications such as full-waveform inversion (FWI).

Acquisition with a monochromatic controlled-frequency source will be referred to as "humming acquisition" herein, and a source operated in this way a "humming source". In this case, the narrowness of the bandwidth is limited by the frequency stability of the source, the length of time the source is active, or the length of time that can be considered as a single "shot point," given the wavelengths of the signal and the speed of motion of the source relative to the acquisition grid. The narrower the bandwidth, the higher the signal-to-noise over that bandwidth for a source of a given amplitude and for a sweep of a given length. Thus, for humming acquisition in particular, improving the frequency stability of the source translates directly into improving the signal-to-noise in the output seismic signal.

For conventional vibratory sources such as marine or land vibrators a "sweep pattern" refers to a desired or idealized profile of pressure or force as a function of time or frequency which is intended to be emitted by a seismic source during its sweep. The sweep pattern might be specified by the designer of the survey and would typically take into account the limitations of the seismic source that is to be used, the desired frequency bandwidth, etc. For purposes of the instant disclosure, a "sweep" should be broadly interpreted to refer to execution of a "sweep pattern" by a seismic source. The actual measured or recorded sweep will, of course, differ from the idealized sweep pattern for reasons well known to those of ordinary skill in the art. According to one embodiment, resonant sources, for which only the amplitude and frequency are typically specified and not the phase, are considered herein.

Conventional broadband sweeps, narrowband sweeps, and humming sweeps are specific examples of types of sweeps, but other sweeps are possible and have been contemplated by the instant inventors. For example in some embodiments a downsweep from 8-2 Hz, or a warbling sweep that oscillates up and down between two frequencies, for example 2-8-2-8 Hz, or a sweep that wanders in frequency in a semi-random fashion might be used in connection with the teachings herein. In brief, the methods of this patent in general may be applied to any kind of sweep.

Figure 4:
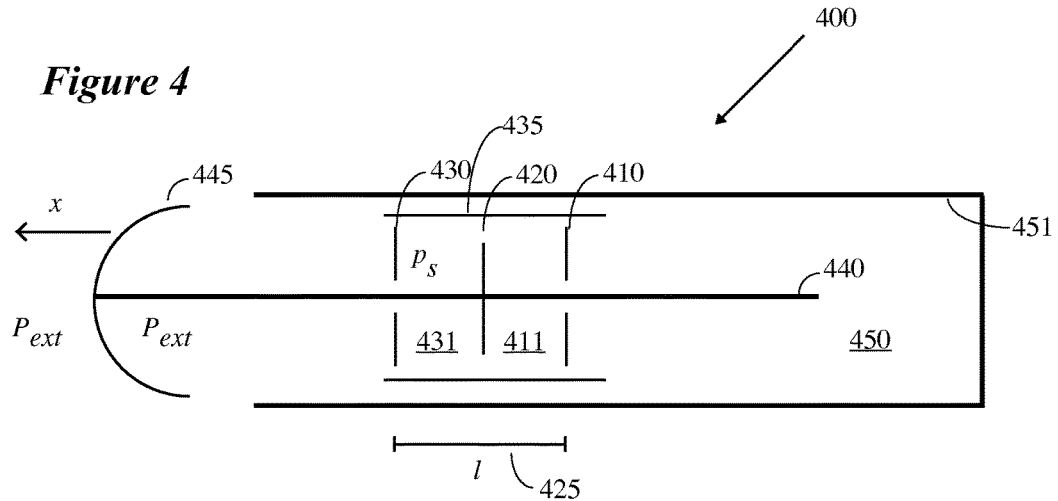
FIG. 4 contains a schematic of a hardware embodiment.

FIG. 4 shows a schematic embodiment of a piston-type marine seismic resonator 400 with a double-ended squeeze piston. In this figure, the radiating piston 445 moves with displacement x against the pressure of the external seawater $P_{ext}$. Seals (not shown) between the radiating piston 445 and the casing 451 prevent ingress of seawater. In an embodiment, the device is shown at equilibrium, x=0, so that the pressure inside the device is also $P_{ext}$. The radiating piston 445 is attached to a shaft 440 that passes through a variable gas spring 435. Attached to the shaft is a piston 420 that moves freely laterally within the gas spring. Seals (not shown) around the perimeter of the piston prevent gas movement around the piston, creating two sealed compartments on either side, 431 and 411. Two laterally movable pistons 430 and 410, similarly sealed around their perimeters, allow the length 425 of the variable gas spring 435, and thus its stiffness, to be varied. The pistons 430 and 410 that determine the length 425 of the variable gas spring 435 will be referred to as "squeeze pistons". The variable length of the gas spring, the total distance of the two gas spaces 411 and 431 between the two squeeze pistons, is given by l. The pressure inside the sealed squeeze-piston compartments 411 and 431 at equilibrium is $p_s$. A resonant piston-type marine seismic resonator such as the one shown in 400 oscillates at a natural frequency that is determined by parameters such as the squeeze piston (410, 430) positions, the gas pressures inside the spaces 411, 431, 450, the outside water pressure $P_{ext}$ (and hence the device operating depth), and to a lesser extent the seal frictions and the force and activation timing of, for example, an actuator (not shown), such as a linear actuator, that feeds energy into the oscillations of the radiating piston. A linear actuator might e.g. be anchored to the casing 451 and be slidingly connected to the shaft 440. The squeeze pistons 430 and 410 control the stiffness of the variable gas spring 435 by changing the equilibrium pressure $p_s$ inside the gas spring. The combined stiffness of the variable gas spring 435 and the gas 450 within the casing in turn controls the resonant frequency of the resonator 400 source.

To perform a given frequency sweep, the squeeze pistons are moved to change the oscillation period as required, but otherwise the device is (for the most part) allowed to oscillate naturally. Typically, the required squeeze-piston trajectories will be calculated before the sweep begins. The device 400 must be so designed that the squeeze pistons 410 and 430 follow these trajectories despite perturbing forces produced by the movement of the shaft 440 and its attached pistons 420 and 445. As a particular example, the motions of the piston 420 can transiently change the pressures in the gas chambers 411 and 431, which without compensation would cause the squeeze pistons 410 and 430 to move in response. This may be achieved either by careful design of the mechanical system that actuates the squeeze pistons 410 and 430 or by means of the control system. It can be achieved via mechanical design by using extremely stiff actuation means to control their position, for example worm gears driven by servo motors, so that the deviation of the pistons 410 and 430 from their desired trajectories is negligibly small. Alternatively the same goal may be achieved by a default feedback control law that causes actuators to act to return the pistons 410 and 430 to their desired trajectories should they deviate. Such a default squeeze-piston control law, e.g., active stiffening, acts to keep the squeeze pistons 410 and 430 on their pre-calculated trajectories despite the perturbing forces introduced by the device's operation.

Another simple control law separately governs the excitation actuator so that it feeds energy into, or draws energy out of, the oscillations as required. A slightly more sophisticated variant of a feedback control law for the squeeze pistons could use the measured internal gas pressure and temperature, outside water pressure, etc., to modify the squeeze-piston trajectories in a predetermined manner so as to compensate for the expected changes in the resonance frequency due to these effects. The required quantities might be calculated (for example, the external pressure can be calculated from the operating depth) or measured.

One possible mode of operation of a resonant piston-type marine seismic resonator is in single-frequency mode, so-called "humming-mode" operation. In an embodiment this mode could be optimal (or nearly so) for frequency-domain FWI, as the device then seeks to reproduce in the field the source waveform used in the algorithm, i.e., a monochromatic sine wave. However, in the field there may be unpredictable forces operating on the device that disturb its regular pulsations, or cause its pulsation frequency to drift.

So, for example, following the default control law the squeeze piston might be positioned so as to theoretically generate an oscillation at 2.0 Hz, but an oscillation at 2.05 Hz is produced instead because the theory behind the control law is only an approximation, or the conditions do not exactly match the assumptions in the control law's calculation. It is this sort of error that an embodiment of the invention is designed to minimize.

As such, in an embodiment the methods taught herein are designed to provide active feedback to the squeeze piston position to keep the device much more nearly on frequency, on average, so that the spectral peak of the device spectrum more closely matches the desired frequency, although short-term perturbations may slightly broaden the spectral peak.

An embodiment will use active adaptive control to keep the resonant oscillation of the seismic source more nearly on frequency. This embodiment uses a feedback loop to adjust a controllable parameter to minimize the discrepancy between the desired state and the measured one. The method can be stabilized in one embodiment by multiplying the calculated perturbation by a stabilization factor between 0 and 1. This stabilization factor may be adjusted as needed during operation. According to this embodiment, the feedback loop utilizes a gradient, an estimate of how a small change in the controllable parameter should affect the discrepancy.

As an example, consider a mismatch ($\Delta f$) in frequency between the device's intended frequency history and its actual performance, as a function of delay after the start of the frequency sweep. This may be calculated in any of a number of ways familiar to those versed in the art of signal processing and analysis, for example by calculating instantaneous frequency, by fitting a sine wave to a short moving window of the signal, or by observing the intervals between zero-crossings. In this example, the time window (TW) would typically include a single cycle of oscillation of the source as a function of the said delay. In an alternative embodiment, the time window (TW) would typically be from the first peak after the initial ramp up of the sweep to the most recent peak, or the previous 30 seconds, whichever was shorter.

The controllable parameter in this embodiment is a perturbation (P) that can be applied to the pre-calculated default squeeze piston position (DSPP). For example, the squeeze piston position (SP) might be positioned one centimeter farther in (P=−0.01 meters) than the default control law would specify in the absence of perturbation (e.g., mathematically, SP=P+DSPP).

Continuing with the previous example, the expected relationship (ER) between squeeze piston position (SP) and resonant frequency (Hz) is known, $$Hz = ER(SP),$$

which can be differentiated to give the required gradient (ER'). Mathematically, the expected change in frequency $\Delta f$ caused by a change dSP in the squeeze piston position SP obeys the formula $$\Delta f \approx dSP * ER'(SP).$$

Here the symbol "≈" indicates approximate equality. The equation will tend to be more accurate, the smaller the quantity dSP, as is well known from standard differential calculus. The equality is also approximate because the expected relationship ER is typically an approximation of the behavior of the physical device. The feedback control associated with this example is then $$\Delta P = \Delta f / ER'(SP),$$

where $\Delta P$ is the estimated required motion to apply to the current squeeze piston position to correct the resonant frequency error. In some embodiments the perturbation P applied to the default squeeze piston position is updated on a specified time interval schedule (TI), for example every few seconds, by $$new\_P = old\_P + \Delta P * SF,$$

where SF is a stabilization factor set by the user and $0 \leq SF \leq 1$. If SF=0 throughout a sweep, then the device is operating according to the default control law.

Several generalizations of this basic algorithm are possible. The method should apply to more complex sweeps than just single-frequency ones. It would be possible in some embodiments to operate two (or more) feedback loops simultaneously, each operating on a different time scale, for example, one with TW=1 minute and TI=10 seconds, and another with TW=5 seconds and TI=1 second, each with its own stabilization factor. The expected relationship function ER may or may not contain terms related to the internal pressure, external pressure, etc. The function ER might slowly update to account for recent measurements. The maximum perturbation change ΔP allowed may be limited.

Particularly for the purposes of frequency-domain FWI, in some embodiments it is beneficial to have data from a source that maintains a constant frequency, i.e. the amplitude peaks occur at the correct time intervals. Embodiments of the methods taught herein could be used to keep the average frequency at least approximately correct. Some embodiments may allow the phase to drift, which can be less of a problem because typical frequency-domain FWI algorithms do not require the phase to be precisely correct on average, just the frequency. That is to say that, since the phase of the signal increases as the integral of frequency over time from the start of transmission, an acceptably-small frequency error may still lead to a large phase error, that is to say an error in excess of a quarter cycle (90 degrees). The expectation is that the optimal aggressiveness factor SF will also vary from day to day and that an experienced operator will quickly learn how to find a suitable value for the current conditions.

Finally, in one embodiment the gradient ER' of the expected relationship between squeeze piston position and resonant frequency may be estimated as follows. As an initial step, ER can be derived from a model of the system. This model may be a mathematical model, allowing ER to be expressed in closed form as a function of system parameters, or the model may be a numerical computer model, requiring time-step modeling to deduce the state of the system at a given time during a sweep, or it may be an empirical model, created by fitting a function to measured data from previous uses of the device. It may also be a combination of any of these. The gradient ER' can then be estimated.

In some embodiments, the expected relationship (ER) between squeeze piston position (SP) and resonant frequency (Hz) may be periodically updated using measured values from the recent history of the device, and this updated function used to improve the current estimate of the gradient function ER'.

Following is an example of a mathematical model allowing ER to be expressed in closed form and its derivative also to be obtained in closed form, calculated for a device with a double-ended variable gas spring 435 such as in the example of FIG. 4.

In this example it will be assumed that the gas within the spring behaves adiabatically over the timescale of a period of the resonance, that is to say that a quarter-period of the resonant oscillation is too short a time for significant transfer of heat energy between the metal structure and the gas to occur within the variable gas spring 435. The small-displacement stiffness of the gas spring can then be determined as can the change in length required to counteract an observed change in resonant frequency.

In this example, to displace the gas spring piston by a distance x from the equilibrium position x=0, the gas spring piston would have to apply a force given by the equation:

$$F = p_s A_s \left( \left( \frac{l/2}{l/2+x} \right)^\gamma - \left( \frac{l/2}{l/2-x} \right)^\gamma \right)$$

where, x is the displacement of the gas spring piston from the central position, $p_s$ is the gas pressure inside the variable gas spring when the piston is at rest, $A_s$ is the gas spring piston area, l is the total length of the gas spring gas space (i.e. the sum of the lengths on both sides of its piston), and, γ is the adiabatic index (ratio of principal specific heats) of the gas in the gas spring.

Differentiation with respect to x and then evaluating the result at x=0 provides an expression for the variable gas spring stiffness k:

$$k = -\frac{dF}{dx} = \frac{4\gamma p_s A_s}{l}.$$

When determining the change in stiffness with length (i.e. squeeze piston position), in this embodiment allowance should be made for the change in gas pressure that this produces. In doing this it will be useful to make a further assumption, that on the time scales over which the gas spring length changes the gas is able to equilibrate thermodynamically with the metal and so the partial derivative ($\partial p_s/\partial l$) behaves in accordance with Boyle's Law (i.e., pressure $p_s$ times volume $A_s l$ is a constant, and thus $$\frac{\partial p_s}{\partial l} = -\frac{p_s}{l}).$$

We then have:

$$\frac{dk}{dl} = \frac{\partial k}{\partial l} + \frac{\partial k}{\partial p_s}\frac{\partial p_s}{\partial l} = -\frac{4\gamma p_s A_s}{l^2} - \frac{4\gamma A_s}{l}\frac{p_s}{l} = -2\frac{k}{l}.$$

To use the previous expression to model a control system, according to this embodiment a model of how gas spring stiffness affects the resonant frequency is also needed. This model could be obtained as follows. The resonant frequency of the system as a whole depends on the shaft mass (the radiating piston and everything attached to it including the shaft and gas spring piston), the casing mass (the casing and everything attached to it), and the gas spring stiffness. It also depends on the stiffness of the gas in the casing 451, which contains a third sealed gas-filled compartment 450. The gas-filled compartment 450, bounded on one side by the freely moving radiating piston 445, functions as a second gas spring. Note that unlike the variable gas spring 435 this second gas spring is not controlled by a movable squeeze piston.

The two stiffnesses will be treated in this example as acting in parallel between the two masses. The well-known formula for the resonant angular frequency of an oscillating system containing two parallel springs is $$\omega = \sqrt{(k+k_v)\left(\frac{1}{m_1} + \frac{1}{m_2}\right)}.$$

Here,
$k_v$ is the stiffness of the gas within the casing ($dF_v/dx$),
$F_v$ is the force on the radiating piston due to the compression of the gas within the casing;
$m_1$ is the shaft mass; and,
$m_2$ is the casing mass.

The effect of changing the gas spring lengths can be calculated as follows:

$$\frac{d\omega}{dl} = \frac{d\omega}{dk}\frac{dk}{dl} = \frac{-1}{2}\frac{\omega}{(k+k_v)}2\frac{k}{l} = \frac{-\omega}{(1+k_v/k)l}$$

In terms of frequency f rather than angular frequency $\omega$:

$$\frac{df}{dl} = \frac{-f}{(1+k_v/k)l}.$$

This previous equation contains one expression for the quantity ER' discussed above, expressed in terms of the total length of the separation of the squeeze pistons.

To include $k_v$ in the model, it will be convenient to again assume in this example that the gas behaves adiabatically on the time scale of a quarter-period, so that an analogous expression to that for the variable gas spring stiffness can be used:

$$k_v = \frac{\gamma P_{ext} A}{L} = \frac{\gamma P_{ext} A^2}{V},$$

where L is an "equivalent length" of the casing gas space, equal to its equilibrium volume V divided by the piston area A. The factor 4 has disappeared because there is only a single gas space 450.

Figure 3:
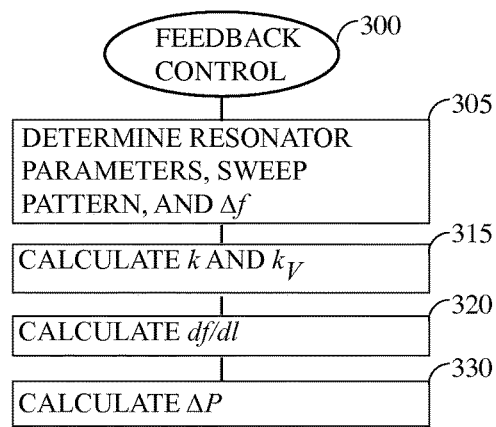
FIG. 3 illustrates an example operating logic for an embodiment of the piston position active control computer's algorithm.

FIG. 3 contains an illustration of how the preceding equations might be used in an embodiment.

In an embodiment the resonator parameters discussed above will be determined (block 305). Some of these parameters might be characteristic of the type of resonator utilized and others might need to be determined separately for each resonator. Further, in some cases parameters that are calculable from those identified above might be determined, i.e., a set of parameters should be determined for the resonator from which those identified above can be calculated. The parameters will typically depend on the desired sweep and more generally on the current configuration of the device.

According to blocks 315 and 320, in an embodiment some of the parameters identified herein will be calculated. Some of these quantities may need to be computed only once per survey. Others may need to be re-determined each shot, for example if the temperature of the device changes with time, or may need to be continuously recalculated during each sweep as the squeeze pistons move and the various internal pressures and stiffnesses used by the algorithm thereby change. It should be understood that in some cases various of these quantities might be repeatedly recalculated as the situation merits.

According to block 220, in this example the default (unperturbed) control law will be used to determine the initial position of the squeeze piston. This positioning might be adjusted depending on the selected survey type (e.g., single frequency, narrow band sweep, etc.) and particular frequencies involved.

According to block 230, a sweep according to the designed sweep pattern will be conducted. Thus, during that sweep, in an embodiment the actual performance of the resonator will be measured and compared with the desired sweep. In some cases, this will be done by counting the zero crossings of the gas spring piston within short time periods in order to establish the sweep accuracy. In the case where a mono frequency sweep is called for, the rate of zero crossing will provide a direct measure of the accuracy of the sweep and the deviation therefrom. If the resonator is sweeping over a range of frequencies, it will still be possible to determine a deviation from the desired sweep frequencies since, in a sweep over a range, an expected frequency at each time point will be known and can be used to compute an expected number of zero crossings over a specified time interval, which can then be compared with the measured number of zero crossings over that time interval. Clearly, there are many alternative ways besides counting zero crossings to establish the frequency deviation of the gas spring piston from the desired frequency and those of ordinary skill in the art will readily be able to devise same.

Finally, given some measure of any of the frequency deviations $\Delta f$, a nominal (unstabilized) $\Delta P$ adjustment can be determined (block 250) using the equations set out above (blocks 315, 320, and 330), scaled by the current value of the stabilization factor SF (block 255), the current perturbation P to the default squeeze piston position updated, and the sweep continued. It should be noted that the computations indicated in block 330 for $\Delta P$ will depend on the units, sign, and baseline for the squeeze-piston position parameter P for the particular device used. For example, if P were measured from the center of the gas spring symmetrically out to each squeeze piston, the value of $\Delta P$ could take the simple form $\Delta P = \Delta l/2$. Block 250 shows the perturbation P being updated at uniform time intervals, but in other embodiments the updates may be made on a varying schedule optimized for the sweep, or the update interval may be another real-time user-controllable variable like the stabilization factor SF.

As an example, consider some conditions that might be typical of a device with a double-sided squeeze piston (such as shown in 400) set to perform a 4 Hz hum at an operating depth of 30 meters. In this particular case, the diameter of the radiating piston will be taken to be 1.38 meters, the area of the squeeze piston 0.25 m², and the interior volume of the device 8 cubic meters. Using the equations set out above, the stiffness for this particular example may be calculated as follows:

l=0.66 m (a value appropriate for a 4 Hz resonance);
$p_s = P_{ext} = 400\ 000$ Pa (ambient pressure at ~30 m water depth);
$A_s = 0.25$ m²;
$A = \pi(1.38\ m/2)^2 = 1.50$ m²;
V=8 m³ and,
γ=1.4 (the adiabatic index of nitrogen).
The foregoing implies that:
k=8.48 10⁵ Nm⁻¹
$k_v$=1.58 10⁵ Nm⁻¹
or, $$\frac{df}{dl} = -5.11 \text{ Hz/m}.$$

Note that the previous equation may be thought of as, in some sense, translating a frequency error into a position error, which position error can then be adjusted according to the teachings set out herein.

For purposes of this example, this implies that in order to correct a 5% drift in frequency (not atypical in these sorts of systems) using a two-piston gas spring, the squeeze pistons would each have to move about $(0.05)(4\text{ Hz})/((5.11\text{ Hz/m})(2))=0.0196$ meters, or about 20 mm. This perturbation should not be overly demanding for many systems of interest.

Those of ordinary skill in the art will realize that the preceding derivation is a small-amplitude approximation, and more sophisticated derivations that are more accurate for larger-amplitude piston oscillations may also be used.

Similarly, those of ordinary skill in the art will appreciate that equivalent derivations are possible for other forms of resonant seismic sources, for example a device with a one-sided squeeze piston, or in general any resonant seismic source with a resonant frequency that can be adjusted by changing some controllable parameter of the device. For example, the resonant frequency of the device 400 could alternatively be controlled by varying its operating depth when being towed and thereby its external gas pressure $P_{ext}$. Changing $P_{ext}$ will shift the equilibrium position of the piston 445, changing the equilibrium volume V such that the equilibrium internal gas pressure in the gas space 450 becomes equal to $P_{ext}$. Combinations of any of the above are also possible, for example the squeeze-piston position could be controlled by a short-time-period feedback loop, and simultaneously the operating depth by a longer-period feedback loop.

Those skilled in the art will also realize that the pre-calculated default squeeze piston position trajectory, DSPP (sweep_time), which determines the nominal sweep that is perturbed away from, may be updated based on the recent history of perturbations P(sweep_time) applied to previous executions of the same sweep, so that the default squeeze piston position adapts to the measured recent behavior of the device. Returning to FIG. 2, feedback process 270 shows an embodiment of this method. As the sweep progresses, the current perturbation P is assembled into a perturbation history P(sweep_time) for that sweep (at box 280). At the completion of the sweep, the fully assembled perturbation history is used to update the nominal sweep parameters (at box 290) and these updated sweep parameters then become the new nominal sweep parameters at the start of the next iteration of the sweep (at box 210).

In other embodiments, the perturbation history P(sweep_time) may be smoothed over time or advanced in time, allowing the device to anticipate frequency errors and begin moving the squeeze pistons to compensate as they occur, instead of allowing the errors to build up, detecting them, and only then responding after some delay, quite possibly overcorrecting in the process. This ability to anticipate and thus react without a delay is particularly desirable for sweeps that significantly change frequency with time (i.e., non-humming sweeps).

In one embodiment, the suggested perturbations may be calculated and stored, but not applied, over one or more instances of the same designated sweep. In this embodiment because the suggested perturbation ΔP is not acted on during the sweep, there is no opportunity to "chase" the correct squeeze piston position within a sweep and update P as the sweep progresses. Instead according to this embodiment a suggested updated squeeze piston position (SUSPP) is calculated and stored according to the formula:

SUSPP(sweep_time)=ΔP+DSPP(sweep_time), where ΔP is periodically evaluated and updated during a sweep as before. It will generally be useful to smooth the resulting SUSPP(sweep_time) to remove discontinuities at the updates of ΔP. In one embodiment, after such smoothing it will be possible to calculate an estimated perturbation history P for this sweep after it is complete by the formula P(sweep_time)=SUSPP(sweep_time)−DSPP (sweep_time).

Further according to this embodiment, a suite of one or more estimated perturbation histories $P_i$(sweep_time), i=1, 2, . . . , N, where N is the number of sweeps in the collection, could then be combined using methods known to those of ordinary skill in the art, which combination might include, for example: 1) discarding outliers, 2) averaging or otherwise combining the remaining values, and then 3) smoothing the resulting function over sweep time. For purposes of the instant disclosure, the term "compiling" will be broadly used to mean operations such as the foregoing which are designed to obtain a representative single perturbation from two or more perturbations obtained from different sweeps. The compiled, e.g., ensemble-average smoothed, perturbation history $P_{avg}$(sweep_time) could then be used to calculate an updated default squeeze piston position trajectory, DSPP(sweep_time) for that sweep:

new_DSPP(sweep_time)=old_DSPP(sweep_time)+ SF*$P_{avg}$(sweep_time).

In one embodiment, the averaging process may apply non-equal weights to the collection of perturbation histories P(sweep_time)$_i$, in particular more recent sweeps could be assigned a proportionately larger weight. This sweep-by-sweep update process could then be repeated as needed in some embodiments. Just as was described previously in connection with the within-a-sweep on-the-fly update strategy, a stabilization factor SF, with 0≤SF≤1, would typically also be included to stabilize this sweep-by-sweep update.

In another embodiment, one of the sweeps that is used to calculate the smoothed ensemble-average perturbation history $P_{avg}$(sweep_time) could be the current, ongoing, sweep $P_{current}$(sweep_time). The ensemble-average perturbation history $P_{avg}$(sweep_time) would then be applied on the fly to the current sweep. This would allow the method to be robust against short-period fluctuations uncorrelated with the sweep, for example deviations from the desired operating depth caused by passing waves, while still adapting to fluctuations of a similar period that are intrinsic to the device. Including the current ongoing sweep in the calculation of the ensemble average would also act to keep each sweep on the desired frequency profile, at least over longer time periods.

Note that while the perturbation history for the current sweep $P_{current}$(sweep_time) must be averaged using methods that honor causality, the perturbation histories recorded for previous sweeps P(sweep_time)$_i$, do not suffer from this restriction. Thus in another embodiment different smoothing, update intervals and stabilization factors SF could be used for the current and previous perturbation histories before they are combined into the ensemble average. In particular, the perturbation history for the current sweep, $P_{current}$(sweep_time), could be filtered to remove components with the same period as the ocean swell, but the same history might not be so filtered when it later becomes just one previous sweep perturbation history in $P_i$(sweep_time).

Those versed in the art of cybernetic control will appreciate that the control method must be carefully matched to the application in hand. Where the perturbation P is being calculated from the state of the source during previous sweeps, it should be calculated in such a way that it is not influenced by changes in state that do not persist from one sweep to the next, i.e. changes that are unpredictable. For example it should not respond to frequency deviations resulting from changes in hydrostatic pressure caused by the passage of ocean waves over the source, which will differ during each sweep. Such unpredictable effects may be dealt with by additional on-the-fly feedback in which an addition to the perturbation P is calculated from the current frequency deviation and applied immediately.

Those versed in the art of cybernetic control will further appreciate that where all or part of the perturbation P is calculated from the current frequency deviation and applied immediately, care must be taken regarding the stability of the feedback system. For example, the system should not respond to components of the frequency deviation having a period equal to twice the response delay of the feedback system. Means of avoiding such instability are well-known to those versed in the art.

Those of ordinary skill in the art will appreciate that there are many possible ways to combine "on-the-fly within-a-sweep" and "sweep-to-sweep" squeeze-piston-position updates, and also many ways to smooth, filter, or stabilize updates beyond the embodiments enumerated above.

The examples provided herein have generally reflected operation of embodiments in a marine environment where the seismic source comprises a resonant gas spring (e.g., either a variable gas spring with its stiffness controlled by a squeeze piston, or a gas spring with its stiffness controlled by tow depth, or both of these in parallel). Those of ordinary skill in the art will also appreciate that the methods of this disclosure apply more generally to any tunable resonant seismic source. For the purposes of this disclosure, the term "tunable resonant seismic source" or "tunable seismic source" will mean any seismic source (land or marine) with an oscillation frequency intrinsic to the physical configuration of the device (i.e., resonant), and that the resonant oscillation frequency can be externally controlled in some manner, i.e. it is "tunable".

For example, instead of a stiff gas spring driving the resonance, the device could incorporate a stiff mechanical spring, or the structure of the device itself could provide the necessary stiffness to resonate against the external water pressure. The device could derive its stiffness from an electro-mechanical resonant system such as a piezoelectric crystal coupled to an inductor and/or capacitor.

The resonant frequency of a tunable resonant seismic source could be tuned in many different ways, depending on the type of device. A device incorporating a gas spring could be tuned by methods other than by a squeeze piston or tow depth, for example by adjusting the composition of the gas inside the gas spring (for example, by changing the adiabatic index of the gas in the gas spring, by injecting helium to increase the frequency, or sulfur hexafluoride to lower the frequency, as compared to a gas spring filled with nitrogen). The resonant frequency of an electro-mechanical system incorporating a piezoelectric crystal coupled to a capacitor could be controlled by means of a variable capacitor. In an embodiment, to implement the methods taught in this disclosure the resonant frequency of the seismic source is measured in real time, and the relation between the resonant frequency and the external control is at least approximately known.

For purposes of the instant disclosure, when it is said that one parameter or variable is "related to" another, that phrase should be broadly interpreted to mean that one parameter/variable is a function (perhaps indirectly) of the other or, more generally, that changes on one parameter/variable will result in changes in the other. As a specific example, when it is said that a parameter is related to the resonance frequency of a device, that means that when the value of the parameter is modified there will be a resulting change in the resonance frequency of that device.

In the foregoing, much of the discussion has been discussed in terms of conventional marine seismic surveys, but that was done for purposes of illustration only and not out of an intent to limit the application of the teachings of the instant disclosure to only those sorts of surveys. Those of ordinary skill in the art will understand how the embodiments presented supra could readily be applied, by way of example, to 2D, 3D, 4D, etc., surveys, down hole surveys, land surveys, or any combination of same, and to cases where other types of controllable sources emit acoustic energy.

Where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Additionally, when it is said that processed or unprocessed seismic data might be used in seismic exploration, that concept should be broadly interpreted to mean that seismic data (processed, minimally processed, or unprocessed) is used to provide images, plots, reports, etc., that are representative of the configuration or properties of the subsurface of the earth. In other words, the seismic source has created seismic waves that are transmitted into and through the subsurface. The passage of the seismic waves through the subsurface modifies them depending on the properties of the media through which they pass. The recorded seismic waves are further transformed from P waves, S waves, surface waves, etc., into electrical impulses that are recorded in the field. Subsequent seismic processing further transforms the electrical signals into the images, plots, reports, etc., that are used to make exploration and/or production decisions.

Still further, when the word "continuously" is used herein, that usage should be understood to mean an operation is performed repeatedly during some period of time. For example, if a quantity is said to be continuously recalculated during some time period, that could mean that the quantity is recalculated every second, every few seconds, every 10 seconds, every 0.1 seconds, etc., with the recalculation spacings being dependent on the length of the time period and context in which the term appears. Additionally, it should be noted that the operations (calculations in the current example) need not be equally spaced but only that they should be spaced apart during the subject time period. For purposes of the instant disclosure, "continuously" will mean nominally performed at intervals of 1 second to 1 minute, including at intervals of 5 seconds, and 10 seconds, where the actual spacing between successive performances might vary substantially about the nominal value.

Additionally, it should be noted that when an operation is said to be performed in "real time", that phrase should be understood to mean that the operation is performed proximate to the time it is requested as opposed to operations that occur at a much later time. By way of example, adjustment of a parameter in real time during a sweep should be understood to mean that the adjustment takes place during the sweep and not after its completion.

While the systems and methods taught herein have been described and illustrated by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration above a region of the subsurface of the earth containing structural or stratigraphic features conducive to the presence, migration, or accumulation of hydrocarbons, the method comprising:
    (a) selecting a controllable source having a squeeze piston integral thereto;
    (b) selecting a sweep pattern;
    (c) performing a sweep with said controllable source using said sweep pattern, said sweep having a sweep duration associated therewith;
    (d) measuring at least one frequency deviation between said performed sweep and said sweep pattern during said sweep, wherein said at least one frequency deviation is a difference between a frequency range of said performed sweep and a frequency range of said sweep pattern;
    (e) calculating at least one squeeze piston position perturbation P based on said at least one frequency deviation and a perturbation history, wherein the at least one squeeze piston position perturbation is applied to a default squeeze piston position to correct said at least one frequency deviation;
    (f) adjusting a position of said squeeze piston within said controllable source while said sweep is being performed based on said squeeze piston position perturbation; and
    (g) recording seismic data generated by said sweep.

2. A method of seismic exploration according to claim 1, wherein steps (c) through (g) are performed a plurality of times, thereby producing a plurality of different sweeps.

3. A method of seismic exploration according to claim 2, wherein step (e) comprises the steps of:
    (e1) calculating the perturbation history P(sweep_time) based on at least one of said at least one squeeze piston position perturbation P, where sweep_time is a time within said sweep duration, wherein the perturbation history P(sweep_time) comprises a plurality of previous sweep_times;
    (e2) assembling a suite of perturbation histories $P_i$(sweep_time), where
    $P_i$(sweep_time) is the perturbation history calculated for the ith sweep, $1 \leq i \leq N$,
    $N \geq 2$ is a number of said plurality of sweeps, and sweep_time is time within said sweep duration;
    (e3) calculating an ensemble-average perturbation history $P_{avg}$(sweep_time), wherein $P_{avg}$(sweep_time) is a compilation of two or more of said $P_i$(sweep_time),
    (e4) calculating new_DSPP(sweep_time)=old_DSPP(sweep_time)+ SF*$P_{avg}$(sweep_time)

where,
    new_DSPP(sweep_time) is an updated default squeeze piston position trajectory as a function of said sweep_ time, old_DSPP(sweep_time) is a current default squeeze piston position trajectory as a function of said sweep_time, and, SF is a stabilization factor in a range 0 to 1 inclusive, and, wherein step (f) comprises the step of (f1) adjusting said squeeze piston position to a position at least approximately equal to said new_DSPP (sweep_time) position as a function of said sweep_time during said sweep, thereby using said updated default squeeze piston position trajectory to adjust said position of said squeeze piston within said resonator.

4. A method of seismic exploration according to claim 1, wherein at least steps (d) through (f) are performed continuously during said sweep, thereby producing a plurality of squeeze piston position perturbations.

5. A method of seismic exploration according to claim 1, wherein said controllable source is selected from the group consisting of a marine resonator, a land resonator, and a borehole resonator.

6. A resonant piston marine seismic resonator comprising:
(a) a housing;
(b) a gas spring situated within said housing;
(c) a squeeze piston within said housing and in fluid communication with said gas spring; and,
(d) a microprocessor in electronic communication with said gas spring and said squeeze piston, said microprocessor containing computer instructions comprising:
 (1) executing a desired sweep pattern using said gas spring;
 (2) measuring at least one frequency deviation between said desired sweep pattern and a sweep pattern actually obtained, wherein said at least one frequency deviation is a difference between a frequency range of said desired sweep pattern and said sweep pattern actually obtained;
 (3) calculating at least one squeeze piston position perturbation P based on said at least one frequency deviation and a perturbation history, wherein the at least one squeeze piston position perturbation is applied to a default squeeze piston position to correct said at least one frequency deviation;
 (4) adjusting a position of said squeeze piston within said resonator based on the calculated at least one squeeze piston position perturbation; and,
 (5) executing said desired sweep pattern after said squeeze piston has been adjusted within said resonator.

7. A method of seismic exploration above a region of the subsurface of the earth containing structural or stratigraphic features conducive to the presence, migration, or accumulation of hydrocarbons, the method comprising:
(a) selecting a tunable controllable source;
(b) selecting a parameter related to a resonant frequency of said controllable source, wherein said parameter is selected from the group consisting of a gas pressure when a gas spring piston is at rest, an area of a gas spring piston, a tow depth of the controllable source, and a total length of a gas spring space within said controllable source;
(c) selecting a sweep pattern;
(d) performing a sweep with said controllable source using said sweep pattern;
(e) measuring at least one frequency deviation between said performed sweep and said sweep pattern during said sweep, wherein said at least one frequency deviation is a difference between a frequency range of said performed sweep and a frequency range of said sweep pattern;
(f) adjusting said parameter related to said resonant frequency of said controllable source during said sweep based on said at least one frequency deviation, wherein said parameter is adjusted to minimize said at least one frequency deviation; and
(g) recording seismic data generated by said sweep.

8. The method of seismic exploration according to claim 7,
wherein said controllable source is a marine resonator, and
wherein said marine resonator has a gas spring piston.

9. A method of seismic exploration according to claim 7, wherein said determined parameter related to a resonant frequency of said controllable source is a total length of a gas spring space, said total length of a gas spring space is controlled by at least one squeeze piston, and wherein step (f) comprises the steps of:
(f1) calculating a squeeze piston position correction ΔP:

$$\Delta P = \Delta f / ER'(SP),$$

where,
Δf is said frequency deviation,
SP is a position of said squeeze piston,
ER' is a gradient of an expected relationship between a squeeze piston position and a resonant frequency of said controllable source;

(f2) calculating $$new\_P = old\_P + \Delta P * SF$$

where,
SF is a stabilization factor in the range 0 to 1,
old_P is a current squeeze piston position perturbation, and,
new_P is an updated perturbation of said squeeze piston position; and, (f3) moving said squeeze piston position to a position at least approximately equal to new_P+DSPP,
where DSPP is a current default sweep piston position being perturbed away from, thereby adjusting said position of said at least one squeeze piston within said resonator.

10. A method of seismic exploration according to claim 7, wherein said controllable source is selected from the group consisting of a marine resonator, a land resonator, and a borehole resonator.

11. The method of seismic exploration according to claim 7,
wherein said controllable source is a marine resonator, and
wherein said marine resonator has a gas spring piston.

12. A method of seismic exploration above a region of the subsurface of the earth containing structural or stratigraphic features conducive to the presence, migration, or accumulation of hydrocarbons, the method comprising:
(a) selecting a controllable source having a gas spring integral thereto;
(b) determining a desired resonant frequency of said controllable source;
(c) setting a tow depth of said controllable source to cause said controllable source to have a resonant frequency at least approximately equal to said desired resonant frequency, wherein said controllable source is a marine resonator;
(d) selecting a sweep pattern;

(e) performing a sweep with said controllable source using said sweep pattern;

(f) measuring at least one frequency deviation between said performed sweep and said sweep pattern, wherein said at least one frequency deviation is a difference between a frequency range of said performed sweep and a frequency range of said sweep pattern;

(g) adjusting the tow depth of said controllable source based on said at least one frequency deviation, thereby adjusting the resonant frequency of said controllable source, wherein the tow depth is adjusted to minimize said at least one frequency deviation; and (h) performing a second sweep of said controllable source using said adjusted tow depth;

(i) recording any seismic data generated by said second sweep.

13. A method of seismic exploration according to claim 12 wherein steps (d) through (i) are performed a plurality of times for a plurality of different sweeps.

14. A method of seismic exploration according to claim 12, wherein said controllable source is selected from the group consisting of a marine resonator, a land resonator, and a borehole resonator.

15. A method of seismic exploration above a region of the subsurface of the earth containing structural or stratigraphic features conducive to the presence, migration, or accumulation of hydrocarbons, the method comprising:

(a) selecting a controllable source having a gas spring integral thereto;

(b) determining at least one parameter related to a resonant frequency of said controllable source, wherein said at least one parameter is selected from the group consisting of a gas pressure when a gas spring piston is at rest, a tow depth of the controllable source, and a total length of a gas spring gas space within said controllable seismic source;

(c) selecting a sweep pattern;

(d) performing a sweep with said controllable source using said sweep pattern;

(e) during said sweep, (e1) continuously determining at least one frequency deviation between said performed sweep and said selected sweep pattern, wherein said at least one frequency deviation is a difference between a frequency range of said performed sweep and a frequency range of said selected sweep pattern, and, (e2) continuously adjusting at least one of said parameters related to a resonant frequency of said controllable source based on said at least one determined frequency deviation, thereby creating an adjusted resonant frequency of said controllable source, wherein said at least one of said parameters is adjusted to minimize said at least one frequency deviation; and (f) recording seismic data generated by said sweep.

16. A method of seismic exploration according to claim 15, wherein said controllable source is selected from the group consisting of a marine resonator, a land resonator, and a borehole resonator.

17. The method of seismic exploration according to claim 15,
wherein said controllable source is a marine resonator, and
wherein said marine resonator has a gas spring piston.

18. A method of seismic exploration above a region of the subsurface of the earth containing structural or stratigraphic features conducive to the presence, migration, or accumulation of hydrocarbons, the method comprising:

(a) selecting a tunable resonant seismic source;

(b) selecting at least one adjustable parameter related to a resonance frequency of said tunable resonant seismic source, wherein said at least one adjustable parameter is selected from the group consisting of a gas pressure when a gas spring piston is at rest, a tow depth of said tunable resonant seismic source, and a total length of a gas spring gas space within said tunable resonant seismic source;

(c) selecting a sweep pattern;

(d) performing a sweep with said tunable resonant seismic source using said sweep pattern;

(e) during said sweep, (e1) measuring at least one frequency deviation between said performed sweep and said sweep pattern, wherein said at least one frequency deviation is a difference between a frequency range of said performed sweep and a frequency range of said selected sweep pattern, and, (e2) adjusting said selected at least one adjustable parameter of said tunable resonant seismic source in real time based on said at least one frequency deviation, thereby adjusting said resonance frequency of said tunable resonant seismic source, wherein said selected at least one adjustable parameter is adjusted to minimize said at least one frequency deviation; and (f) recording seismic data generated by said sweep.

19. A method of seismic exploration according to claim 18, wherein said tunable seismic source is selected from the group consisting of a marine resonator, a land resonator, and a borehole resonator.

20. A method of seismic exploration according to claim 18, wherein step (e) is continuously performed a plurality of times during said sweep.

21. The method of seismic exploration according to claim 18,
wherein said tunable resonant seismic source is a marine resonator, and
wherein said marine resonator has a gas spring piston.

22. A method of seismic exploration above a region of the subsurface of the earth containing structural or stratigraphic features conducive to the presence, migration, or accumulation of hydrocarbons, the method comprising:

(a) selecting a tunable resonant seismic source;

(b) selecting at least one adjustable parameter related to a resonance frequency of said tunable resonant seismic source, wherein said at least one adjustable parameter is selected from the group consisting of a gas pressure when a gas spring piston is at rest, a tow depth of said tunable resonant seismic source, and a total length of a gas spring gas space within said tunable resonant seismic source;

(c) selecting a sweep pattern;

(d) performing a sweep with said tunable resonant seismic source using said sweep pattern;

(e) measuring at least one frequency deviation between said performed sweep and said sweep pattern, wherein said at least one frequency deviation is a difference between a frequency range of said performed sweep and a frequency range of said sweep pattern;

(f) adjusting at least one of said at least one adjustable parameter of said tunable resonant seismic source based on said at least one frequency deviation, thereby adjusting said resonance frequency of said tunable resonant seismic source, wherein said at least one of said adjustable parameters is adjusted to minimize said at least one frequency deviation;

(g) performing a second sweep of said tunable resonant seismic source after said resonance frequency has been adjusted; and (h) recording any seismic data generated by said second sweep.

* * * * *